United States Patent

Hemmer et al.

[11] Patent Number: 6,080,510
[45] Date of Patent: Jun. 27, 2000

[54] TERNARY MIXED LITHIUM OXIDES, PROCESS FOR PREPARING THE SAME, AND SECONDARY LITHIUM BATTERY FORMED THEREFROM

[75] Inventors: Reinhard P. Hemmer, Illertissen; Rüdiger Oesten, Ulm; Margret Wohlfahrt-Mehrens, Illertissen; Gisela Arnold, Ulm, all of Germany

[73] Assignee: Zentrum fur Sonnenenergie-und Wasserstoff Forshung Baden Wurttemberg Gemeinnultzige Stiftung, Stuttgart, Germany

[21] Appl. No.: 08/817,339

[22] PCT Filed: Sep. 28, 1995

[86] PCT No.: PCT/EP95/03842

§ 371 Date: Jun. 30, 1997

§ 102(e) Date: Jun. 30, 1997

[87] PCT Pub. No.: WO96/10538

PCT Pub. Date: Apr. 11, 1996

[30] Foreign Application Priority Data

Sep. 30, 1994 [DE] Germany .................. 44 35 117

[51] Int. Cl.[7] .............. H01M 4/58; C01F 13/14; C01G 49/00; C01G 45/12

[52] U.S. Cl. .............. 429/224; 429/223; 429/221; 429/220; 423/593; 423/594; 423/596; 423/598; 423/599

[58] Field of Search ................ 429/224, 223, 429/221, 220; 423/593, 594, 598, 596, 599

[56] References Cited

U.S. PATENT DOCUMENTS

| | | |
|---|---|---|
| 4,567,031 | 1/1986 | Riley . |
| 4,980,251 | 12/1990 | Thackeray et al. . |
| 5,084,366 | 1/1992 | Toyoguchi et al. .............. 429/224 |
| 5,135,732 | 8/1992 | Barboux et al. . |
| 5,264,201 | 11/1993 | Dahn et al. .............. 423/594 |
| 5,565,688 | 10/1996 | Hayashi et al. .............. 252/182.1 |
| 5,567,401 | 10/1996 | Doddapaneni et al. .............. 423/179.5 |
| 5,677,087 | 10/1997 | Amine et al. .............. 429/224 |
| 5,742,070 | 4/1998 | Hayashi et al. .............. 252/182.1 |
| 5,783,332 | 7/1998 | Amine et al. .............. 429/218 |

FOREIGN PATENT DOCUMENTS

| | | |
|---|---|---|
| 338 799 | 10/1989 | European Pat. Off. . |
| 468 942 | 1/1992 | European Pat. Off. . |
| 94/25398 | 11/1994 | WIPO . |

OTHER PUBLICATIONS

The Spinel Phase of LIMn2O4 as a Cathode in Secondary Lithium Cells, J.M.Tarascon et al, J. Electrochem.Soc., vol. 138, No. 10 Oct. 1991, pp. 2859–2864.

(List continued on next page.)

*Primary Examiner*—Maria Nuzzolillo
*Assistant Examiner*—Tracy Dove
*Attorney, Agent, or Firm*—Pillsbury Madison & Sutro LLP

[57] ABSTRACT

Ternary lithium mixed oxides having a spinel-type crystal structure and the general formula (I) $Li_yMe_xMn_{2-x}O_4$ are disclosed. In this formula (I), Me represents a metal cation from groups IIa, IIIa, Iva, IIb, IIIb, IVb, VIb, VIIb, and VIII of the Periodic Table of Elements, x is in a range between 0 and 1, and y is in a range of greater than zero and not more than 1.2. The ternary mixed lithium oxide is obtainable by reacting reaction components in the form of hydroxides and/or water-soluble metal salts dissolved in a basic aqueous medium to form a homogenous suspension of the hydroxylic reaction products, removing water and optionally further solvents from the suspension, and subjecting the dried reaction products to heat treatment by heating them to temperatures between 500° C. and 900° C. at a heating speed of between 1 K/min and 20 K/min. The respective mixed oxides obtained are in a form which has no phase having a radiographic effect. These mixed oxides are suitable, in particular, as cathode materials in lithium secondary batteries.

17 Claims, 3 Drawing Sheets

OTHER PUBLICATIONS

Mat.Res.Bull.vol. 18, pp 461–472, 1983, "Lithiium Insertion into Manganese Spinels" M.M. Thackeray Apr. 1983.

A 4 V Lithium Manganese Oxide Cathode for Rocking-Chair Lithium-Ion Cells, H.Huang et al., J.Electrochem.Soc., vol. 141, No. 9, Sep. 1994, pp. 106–107.

Journal of Solid State Chemistry 88,pp. 325–333 1990, "Sol–Gel Synthesis of Manganese Oxides" S. Bach et al May 1990.

Japan Abstract JP 03–283 356 Kenji Takahashi et al Dec. 1991.

TERNARY MIXED LITHIUM OXIDES, PROCESS FOR PREPARING THE SAME, AND SECONDARY LITHIUM BATTERY FORMED THEREFROM

This application is the national phase of international application PCT/EP95/03842, filed Sep. 28, 1995 which designated the U.S.

BACKGROUND OF THE INVENTION

1. Field of the Invention

The present invention relates to ternary mixed lithium oxides, in particular to doped lithium manganese oxides having a spinel-type crystal structure. The present invention further relates to a process for preparing ternary mixed lithium oxides and to their use, in particular as a cathode material in secondary lithium batteries.

2. Description of the Related Art

Because of the high energy density rechargeable lithium batteries can achieve and because of their low weight, there is a growing need for rechargeable lithium batteries for a wide range of applications, both as electric accumulators for portable electronic equipment such as e.g. video cameras or laptop computers, and, in future, as traction batteries.

The use of elemental lithium as an anode material is known to result in inadequate cycle stability of the battery, owing to dendrite formation when the lithium is dissolved and redeposited, and in a considerable safety risk.

An attempt to overcome these problems led to the development of the so-called "lithium ion" or "rocking chair" battery. Its functional principle is based on the use of electrode materials which are able to intercalate lithium reversibly, both for the anode and the cathode. At present, a lithium-containing carbon compound is usually employed as the anode and a lithium-containing ternary oxide system is used as the cathode.

So as to be able to achieve the highest possible energy densities, cathode materials are preferably employed which are able to intercalate lithium at potentials of between 3 and 4 V vs. Li/Li$^+$. Among the most promising materials meeting these requirements are ternary lithium compounds on the basis of oxides of cobalt, nickel and manganese.

Among the lithium manganates, the spinel $LiMn_2O_4$ and compounds related to spinels (e.g. $Li_4Mn_4O_9$ and $Li_4Mn_5O_{12}$) exhibit the best characteristics as cathode materials (Thackeray et al., Mater. Res. Bull. 18, 561 (1983)).

As a rule, these materials are prepared by means of solid-state reactions by the corresponding oxides and/or carbonates being mixed together and the mixtures being heated to elevated temperatures (U.S. Pat. No. 4,980,251; J. Electrochem. Soc., Vol. 138, No. 10, 1991, pp. 2859–2864; and JP-A-03-283 356). As a rule, this gives rise to stoichiometric spinels whose cycle lifetime is usually inadequate.

According to the prior art, the battery-relevant characteristics of these cathode materials, in particular those of the manganese oxides, depend critically on the preparation parameters and especially on the reaction temperature.

Advantages are offered by a synthesis process at the lowest possible temperatures, which results in materials having a uniform particle distribution. According to U.S. Pat. No. 5,135,732 and H. Huang, J. Electrochem. Soc. 141 (1994) L76, the relevant lithium compounds on the basis of cobalt oxide or manganese oxide can also be prepared by a low-temperature synthesis via acetate precursors.

A partial reduction of permanganate solutions likewise allows the synthesis of lithium manganese oxides at low temperatures (Bach et al., J. Solid State Chem. 88 (1988), 325).

The pure ternary oxides have only a limited cycle lifetime, and a continuous deterioration of the capacity is often observed as the number of cycles increases, which can be ascribed to changes and defects in the lattice structure of the host oxide as lithium cations are being incorporated and removed.

With all the low-temperature synthesis processes known hitherto, which give rise to cathode materials having spinel structures or spinel-related structures, the product is a pure ternary oxide or a ternary oxide containing admixtures of carbon which is not incorporated in the lattice.

SUMMARY OF THE INVENTION

It is an object of the invention to provide doped ternary mixed lithium oxides which are suitable, in particular, as a cathode material in rechargeable secondary lithium batteries. Another object is to provide a simple process for preparing these mixed oxides, which permits systematic control of type and degree of doping.

In accordance with and embodiment of the present invention, these and other objects are achieved by providing a ternary mixed lithium oxide having a general formula $Li_yMe_xMn_{2-x}O_4$, in which Me represents a metal cation selected from groups IIa, IIIa, IVa, IIb, IIIb, IVb, VIb, VIIb and VIII of the Periodic Table of the Elements.

In accordance with another embodiment of the present invention, a process is provided for forming the aforementioned ternary mixed lithium oxide by reacting suitable reaction components in the form of hydroxides and/or water-soluble salts in dissolved form in a basic aqueous medium to form a homogenous suspension. Water and other solvents are removed from the suspension of the hydroxylic reaction products and the dried reaction products are heated to a temperature in a range of between 500° C. and 900° C. using a heating rate of 1 K/min to 20 K/min. The mixed oxides are formed in roentgenographically pure-phase form.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The invention is explained in more detail with reference to the drawings, in which.

DETAILED DESCRIPTION OF THE INVENTION

Figure 1:
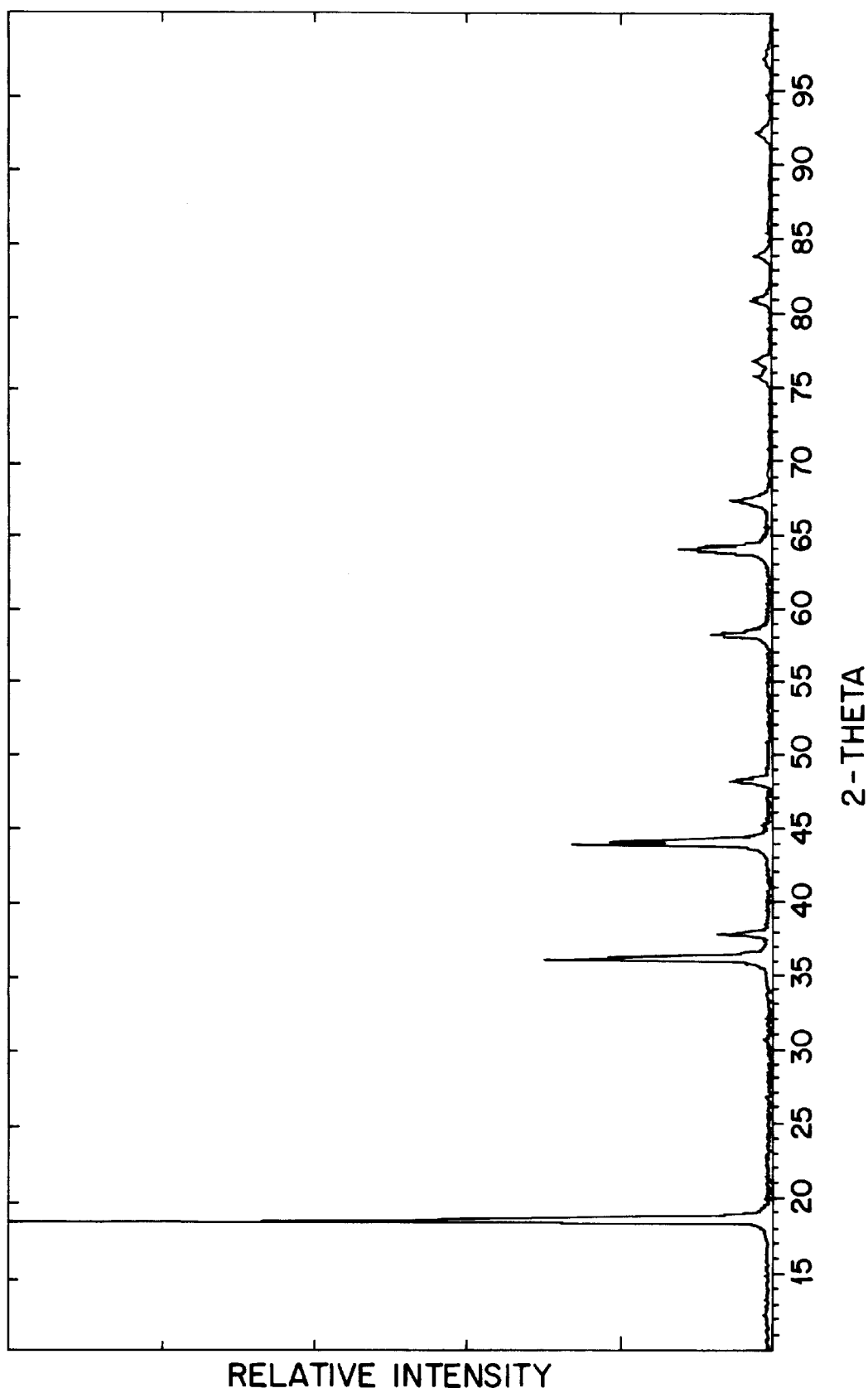
FIG. 1 shows the X-ray powder diffractogram of the mixed oxide obtained in Example 1.

The invention therefore relates to ternary mixed lithium oxides of the general formula (I) having a spinel-type crystal structure $$Li_yMe_xMn_{2-x}O_4 \qquad (I)$$

where:

Me represents at least one metal cation from the groups IIa, IIIa, IVa, IIb, IIIb, IVb, VIb, VIIb and VIII of the Periodic Table of the Elements, $0<x<1$, preferably $0<x<0.5$,
$0<y\leq 1.2$,
obtainable by reaction components required to obtain the mixed oxides in question of formula (I) being reacted in the form of hydroxides and/or water-soluble metal salts in dissolved form in a basic aqueous medium to form a homogeneous suspension, water and possibly further solvents being removed from the suspension of the hydroxylic reaction products, and the dried reaction products being subjected to a high-temperature treatment by heating to temperatures of between 500 and 900° C. involving a heating rate of from 1 to 20 K/min, the mixed oxides in question being formed in roentgenographically pure-phase form.

It was found, according to the invention, that doping with impurity cations in the host lattice of the compounds according to the invention in many cases results in beneficial effects within the host lattice. Doping with metal cations of various oxidation states allows the preparation of nonstoichiometric compounds having controlled defects in the host lattice structure. These changes bring about a stabilization of the host lattice structure during electrochemical cycling, ultimately resulting in an increased service life when it is used as a cathode material.

The mixed oxides according to the invention differ from the known generic mixed oxides in that they have a completely uniform distribution of the dopants in the host lattice, as a result of which improved battery characteristics are achieved if they are employed as cathode materials.

The metal cation Me in the above formula (I) is preferably at least one cation selected from transition metals of the 4th period of the Periodic Table of the Elements. Particularly suitable metal cations are iron, titanium and aluminium, also cobalt and nickel.

The invention also relates to a process for preparing ternary mixed lithium oxides, which comprises the steps of reaction components required to obtain the mixed oxides in question of formula (I) being reacted in the form of hydroxides and/or water-soluble metal salts in dissolved form in a basic aqueous medium to form a homogeneous suspension, water and possibly further solvents being removed from the suspension of the hydroxylic reaction products, and the dried reaction products being subjected to a high-temperature treatment by heating to temperatures of between 500 and 900° C. involving a heating rate of from 1 to 20 K/min, the mixed oxides in question being formed in roentgenographically pure-phase form.

The process according to the invention is advantageous in that the reaction of the reactants can be carried out at low temperatures, suitably at temperatures in the range of about 0–25° C. Preferably the reaction is carried out at 2–15° C., more preferably at 5–10° C.

According to the invention the reactants are employed in the form of hydroxides and/or water-soluble metal salts. In some cases, for example when doping with aluminium, stabilized oxide sols can be employed.

As a rule, only some of the hydroxide ions required for primary oxide precipitation can be introduced directly as metal hydroxide. The amount of basic components required can, however, be readily achieved by the addition of aliquots of ammonia and/or water-miscible amines to the reaction mixture. Suitable amines are primary, secondary or tertiary amines, for example methylamine, dibutylamine or trimethylamine.

Advantageously, the metal cations Me can be added to the reaction mixture in a form stabilized by complexing. Suitable stabilizing complexing agents are those, in particular, which are able to act as bidentate, tridentate or polydentate ligands on the metal cation in question, the donor atom optionally being nitrogen, oxygen or carbon. Examples to be mentioned of nitrogen ligands suitable as complexing agents include 1,2-diaminoethane, 1,3-diaminopropane, N,N,N',N'-tetramethyldiaminoethane and triethanolamine. It is also possible for the metal cations acting as dopants, for example aluminium and titanium, to be introduced in the form of their 2,4-pentanedionates or in the form of their alkoxides. Additionally, the metal cations, for example aluminium, titanium or zirconium can also be employed in the form of their alkyl compounds or, for example in the case of titanium or zirconium, in the form of their cyclopentadienyl compounds.

Suitable solvents for the reaction according to the novel process include water or water/alcohol mixtures. If metal alkyls or complexes containing π-bound ligands, for example cyclopentadienyl ligands, are used, the solvents should be selected in accordance with the specific character of the metal-carbon bond in these reactants. Suitable reactants include mixtures of low molecular-weight hydrocarbons with water-miscible alcohols, particularly if the coprecipitation is performed slowly and the reaction can be carried out with stirring at high speeds. Thus it is even possible to carry out precipitations using two solvents which are not miscible or only partially miscible with one another.

In the process according to the invention, the precipitation of the solids fractions is performed simultaneously and preferably slowly, so that a stable, i.e. non-sedimenting, suspension is obtained. Ultimately this makes it possible to obtain mixed oxides having an extremely homogeneous distribution of the metal cations introduced as dopants. A possible reason for this homogeneous distribution of the dopants is that the metal cations which are dissolved during the reaction are distributed very homogeneously in the "wet" hydroxylic reaction product obtained as an intermediate. This homogeneous distribution is a crucial advantage compared with the known processes for preparing such mixed oxides by means of solid state reactions.

The suspensions thus obtained comprise extremely fine particles of the hydroxylic reaction products formed, with a very narrow particle size distribution. The average particle size is usually 10 μm or less. The suspensions do not show any tendency to sediment over long periods, from about 5 to 30 hours. They can be stored at room temperature without difficulty.

To prepare for the conversion of reaction products into the mixed oxide stage, water and possibly further solvents must be removed from the suspension. For this purpose the suspension is preferably subjected to spray-drying which is suitably carried out at temperatures of between 120 and 200° C. Equally it is possible, although more time-consuming, to subject the suspension to freeze-drying. Freeze drying is suitably performed on droplets of the suspension which have been spherically solidified with liquid nitrogen.

The dried reaction product as a rule exists as a loose powder. If this powder is hygroscopic, it should be handled under a dry protective gas.

The pulverulent reaction product thus obtained can then be subjected to a high-temperature treatment in a suitable furnace, for example a muffle furnace, involving heating to from 500 to 900° C., preferably from 600 to 800° C.

The mixed oxides thus obtained have high phase purity and are distinguished by good electrochemical characteristics for the use as a cathode material. The invention therefore likewise relates to the use of the novel mixed oxides as a cathode material in secondary lithium batteries, for example in so-called "rocking chair" batteries.

The process according to the invention allows the mixed oxides to be prepared in large quantities. Since the reactants are reacted in homogeneous, dissolved form, the known difficulties associated with solid state reactions do not occur precisely when relatively large quantities are being prepared. Homogeneous-phase reaction of the reactants makes it possible, in particular, for extremely small amounts of dopants to be distributed very uniformly in the solid matrix, which is not possible or not possible to that extent in the case of the known solid state reactions.

The invention is explained in more detail with reference to the following examples.

EXAMPLE 1

Preparation of a Mixed Oxide of the Formula $LiFe_{0.1}Mn_{1.9}O_4$

A homogeneous mixture of 6.13 g (0.25 mol) of lithium hydroxide, 75 ml of a 25 vol % aqueous ammonia solution and 500 ml of deionized water was anaerobicized with nitrogen for 15 minutes and at the same time cooled to 5° C. This clear solution is admixed, with magnetic stirring at this temperature, with a previously anaerobicized aqueous solution of 184.42 (0.72 mol) of manganese dinitrate tetrahydrate, dissolved in 150 ml of water, over a period of 5 hours. Oxygen being strictly excluded, a pure white suspension (parent suspension) is obtained.

250 ml of the parent suspension are mixed, over a period of 2 hours at 5° C. with stirring, with a freshly prepared anaerobicized, clear solution of 8.16 g (0.02 mol) of iron trinitrate nonahydrate in 20 ml of water. The cocoa-brown suspension formed is stored at 5° C. until further processing, air being excluded. The suspension thus prepared does not show any tendency to sediment over a period of hours.

For further processing into a solid, the suspension is heated to 20 to 40° C. with stirring and is then freed from adhering moisture by spray-drying (pumping capacity: 2 ml/min, nozzle: 0.7 mm, carrier gas flow: 300 l/h, inlet temperature: 156° C.). During the spray-drying itself, air is admitted. The dried black product is hygroscopic and must be protected from the ingress of moisture until further processing.

To convert it into the oxide phase, the product was heated from room temperature to 700° C., dried air flowing across it at the same time. The heating rate was 3K/min. The end temperature was maintained for 12 hours without additional air being supplied.

FIG. 1 shows the X-ray powder diffractogram of the mixed oxide obtained in the process.

Figure 2:
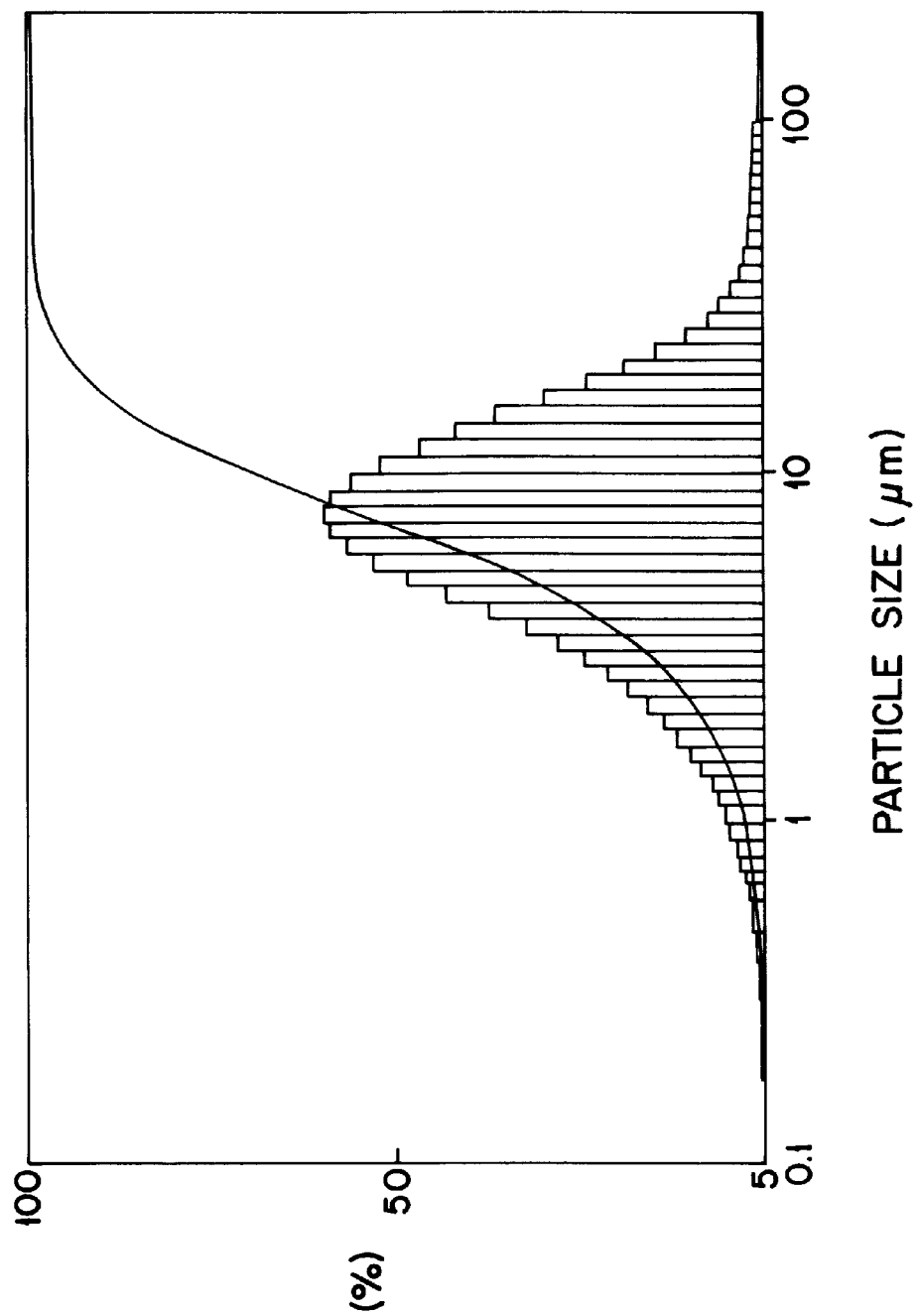
FIG. 2 shows the powder particle distribution diagram of the mixed oxide obtained in Example 1.

FIG. 2 shows the result of a particle size distribution analysis of this mixed oxide. The average particle size ($d_{50}$) is seen to be about 10 $\mu$m.

Figure 3:
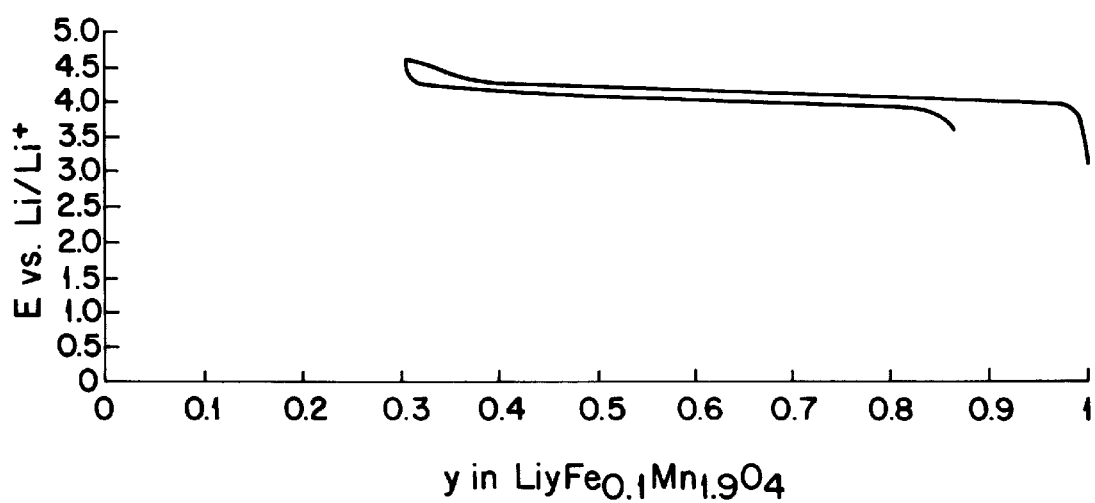
FIG. 3 shows the charging and discharging curve of the mixed oxide obtained in Example 1 when employed as the positive electrode in a secondary lithium battery.

FIG. 3 shows the charging and discharging curve of this mixed oxide between 4.6 and 3.5 V when used as the positive electrode in a secondary lithium battery.

The negative electrode used in this case was lithium metal.

EXAMPLE 2

Preparation of a Mixed Oxide of the Formula $LiTi_{0.1}Mn_{1.9}O_4$ 250 ml of the parent suspension obtained in accordance with Example 1 is admixed dropwise, as described in Example 1, with 4.56 g (0.02 mol) of tetraethoxytitanium, dissovled in 10 ml of anaerobicized absolute ethanol. A pale yellow suspension is formed only gradually, owing to the slow hydrolysis of the titanium alcoholate. The sedimentation-stable suspension is freed from adhering liquid by spray-drying (pumping capacity: 3 ml/min, nozzle: 0.7 mm, carrier gas flow 350 l/h, inlet temperature 160° C.). The product is pale brown.

The conversion into the oxide phase is carried out as described in Example 1.

EXAMPLE 3

Preparation of a Mixed Oxide of the Formula $LiNi_{0.1}Mn_{1.9}O_4$ 250 ml of the parent suspension obtained in accordance with Exampl 1 is admixed dropwise at 0° C., as described in Example 1, with a solution of 5.86 g (0.02 mol) of nickel dinitrate hexahydrate and in 10 ml of anaerobicized water. The pale olive-green suspension is heated to 45° C. to spray-dry it and is stirred during spraying (pumping capacity: 1 ml/min, nozzle: 0.7 mm, carrier gas flow 300 l/h, inlet temperature 157° C., stirring: 600 rpm). After spray-drying, an ochreous, weakly hygroscopic solid is obtained.

The conversion into the oxide phase is carried out as described in Example 1.

What is claimed is:

1. A ternary mixed lithium oxide in roentgenographically pure-phase form having a spinel-type crystal structure,
   wherein the ternary mixed lithium oxide has a general formula $Li_yMe_xMn_{2-x}O_4$ in which Me represents a metal cation from groups IIa, IIIa, IVa, IIb, IIIb, IVb, VIb, VIIb and VIII of the Periodic Table of the Elements, x is in a range greater than 0 and less than 1, and y is in a range of greater than zero and not more than 1.2, and
   wherein the ternary mixed lithium oxide is obtainable by reacting under anaerobic conditions reaction components selected from the group consisting of hydroxides, water-soluble metal salts, and a combination thereof dissolved in a basic aqueous medium to form a homogeneous suspension containing hydroxylic reaction products which are stable for up to about 30 hours, removing water and any solvents present from the suspension of the hydroxylic reaction products, heating the reaction products to between 500° C. and 900° C. at a heating rate in a range of from 1 to 20 K/min, and forming the ternary mixed lithium oxide having therein homogeneously distributed metal cations, the ternary mixed lithium oxide being in the roentgenographically pure-phase form.

2. A ternary mixed lithium oxide according to claim 1, wherein Me is at least one cation selected from the group consisting of transition metals of the fourth period of the Periodic Table of Elements.

3. A ternary mixed lithium oxide according to claim 1, wherein Me is a cation selected from the group consisting of iron, titanium, aluminum, cobalt and nickel.

4. An alkaline process for preparing a ternary mixed lithium oxide in roentgenographically pure-phase form having a spinel-type crystal structure and a general formula $Li_yMe_xMn_{2-x}O_4$ in which Me represents a metal cation from groups IIa, IIIa, IVa, IIb, IIIb, IVb, VIb, VIIb and VIII of the Periodic Table of the Elements, x is in a range of between 0 and 1, and y is in a range of greater than 0 to not more than 1.2, said process comprising the following steps:

reacting under anaerobic conditions reaction components selected from the group consisting of hydroxides, water-soluble metal salts, and a combination thereof dissolved in a basic aqueous medium to form an alkaline homogeneous suspension containing hydroxylic reaction products which are stable for up to about 30 hours;

removing water and any other solvents from the alkaline homogeneous suspension;

heating the hydroxylic reaction products to between 500° C. and 900° C. at a heating rate of from 1 K/min to 20 K/min; and forming the ternary mixed lithium oxide in roentgenographically pure-phase form.

5. An alkaline process according to claim 4, wherein said anaerobic reacting step is carried out in a range of 0–25° C.

6. An alkaline process according to claim 4, wherein said anaerobic reacting step is conducted in the presence of at least one solvent selected from the group consisting of water, a mixture comprising water and alcohol, and a mixture comprising low molecular-weight hydrocarbons and water-miscible alcohols.

7. An alkaline process according to claim 4, further comprising the step of adding at least one member selected from the group consisting of ammonia and water-miscible amines to standardized the basic aqueous medium.

8. An alkaline process according to claim 4, wherein the metal cations Me entering into the reaction are in a form stabilized by complexing.

9. An alkaline process according to claim 4, wherein said removing step comprises spray drying the alkaline homogeneous suspension.

10. An alkaline process according to claim 9, wherein the spray drying is carried out at a temperature in a range of between 120° C. and 200° C.

11. An alkaline process according to claim 4, wherein said removing step comprises freeze drying the alkaline homogeneous suspension.

12. A ternary mixed lithium oxide according to claim 1, wherein x is greater than 0 and less than 0.5.

13. An alkaline process according to claim 4, wherein Me is at least one cation selected from the group consisting of transition metals of the fourth period of the Periodic Table of the Elements.

14. An alkaline process according to claim 4, wherein Me is a cation selected from the group consisting of iron, titanium, aluminum, cobalt and nickel.

15. An alkaline process according to claim 4, wherein said reacting step is carried out at a temperature in a range of 2–15° C.

16. An alkaline process according to claim 4, wherein said reacting step is carried out at a temperature in a range of 5–10° C.

17. A secondary lithium battery comprising cathode material comprising a ternary mixed lithium oxide in roentgenographically pure-phase form having a spinel-type crystal structure, wherein the ternary mixed lithium oxide has a general formula $Li_yMe_xMn_{2-x}O_4$ in which Me represents a metal cation from groups IIa, IIIa, IVa, IIb, IIIb, IVb, VIb, VIIb and VIII of the Periodic Table of the Elements, x is in a range greater than 0 and less than 1, and y is in a range of greater than zero and not more than 1.2, and wherein the ternary mixed lithium oxide is obtainable by reacting under anaerobic conditions reaction components selected from the group consisting of hydroxides, water-soluble metal salts, and a combination thereof dissolved in a basic aqueous medium to form an alkaline homogeneous suspension containing hydroxylic reaction products which are stable for up to about 30 hours, removing water and any solvents present from the suspension of the hydroxylic reaction products, heating to between 500° C. and 900° C. at a heating rate in a range of from 1 to 20 K/min, and forming the ternary mixed lithium oxide having therein homogeneously distributed metal cations, the ternary mixed lithium oxide being in the roentgenographically pure-phase form.

* * * * *